(12) United States Patent
Wan et al.

(10) Patent No.: US 12,147,886 B2
(45) Date of Patent: Nov. 19, 2024

(54) PREDICTIVE MICROSERVICES ACTIVATION USING MACHINE LEARNING

(71) Applicant: International Business Machines Corporation, Armonk, NY (US)

(72) Inventors: Meng Wan, Beijing (CN); Li Na Guo, Beijing (CN); Wang Liu, Beijing (CN); Xue Rui Hu, Beijing (CN); Mei Qin Si, Beijing (CN); Hong Yan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 17/060,165

(22) Filed: Oct. 1, 2020

(65) Prior Publication Data

US 2022/0108147 A1    Apr. 7, 2022

(51) Int. Cl.
*G06N 3/04* (2023.01)
*G06F 18/10* (2023.01)
*G06F 18/21* (2023.01)
*G06F 18/213* (2023.01)
*G06F 18/214* (2023.01)
(Continued)

(52) U.S. Cl.
CPC .............. *G06N 3/04* (2013.01); *G06F 18/10* (2023.01); *G06F 18/213* (2023.01); *G06F 18/214* (2023.01); *G06F 18/2178* (2023.01); *G06N 3/08* (2013.01); *H04L 67/133* (2022.05); *H04L 67/51* (2022.05)

(58) Field of Classification Search
CPC . G06N 3/04; G06N 3/08; H04L 67/51; G04L 67/133; G06F 18/2178; G06F 18/10; G06F 18/214; G06F 18/213
See application file for complete search history.

(56) References Cited

U.S. PATENT DOCUMENTS 10,547,522 B2 * 1/2020 Hutchison ........... H04L 41/5051
2019/0068627 A1   2/2019 Thampy
(Continued)

OTHER PUBLICATIONS

Abdullah, M., et al, Predictive Autoscaling of Microservices Hosted in Fog Microdata Center, Retrieved from Internet:<https://ieeexplore.ieee.org/abstract/document/9113681> (Year: 2020).*
(Continued)

*Primary Examiner* — Brian M Smith
*Assistant Examiner* — Bart I Rylander
(74) *Attorney, Agent, or Firm* — Stosch Sabo (57) ABSTRACT

Described are techniques for predictive microservice activation. The techniques include training a machine learning model using a plurality of sequences of coordinates, where the plurality of sequences of coordinates are respectively based upon a corresponding plurality of series of vectors generated from historical usage data for an application and its associated microservices. The techniques further include inputting a new sequence of coordinates representing a series of application operations to the machine learning model. The techniques further include identifying a predicted microservice for future utilization based on an output vector generated by the machine learning model. The techniques further include activating the predicted microservice prior to the predicted microservice being called by the application.

20 Claims, 8 Drawing Sheets

(51) Int. Cl.
  *G06N 3/08* (2023.01)
  *H04L 67/133* (2022.01)
  *H04L 67/51* (2022.01)

(56) References Cited

U.S. PATENT DOCUMENTS

2019/0173940 A1  6/2019  Bagarolo et al.
2020/0159557 A1  5/2020  Pasupathy et al.

OTHER PUBLICATIONS

Han, Z., et al, SeqXY2SeqZ: Structure Learning for 3D Shapes by Sequentially Predicting 1D Occupancy Segments from 2D Coordinates, Retrieved from Internet:<https://link.springer.com/chapter/10.1007/978-3-030-58586-0_36> (Year: 2020).*

Ma, S., et al, Using Service Dependency Graph to Analyze and Test Microservices, Retrieved from Internet:<https://ieeexplore.ieee.org/abstract/document/8377834> (Year: 2018).*

Xu, K., et al, Graph2Seq: Graph to Sequence Learning with Attention-Based Neural Networks, Retrieved from Internet:<https://arxiv.org/abs/1804.00823> (Year: 2018).*

Liu, Z., et al, A Feedback Mechanism for Prediction-based Anomaly Detection In Content Delivery Networks, Retrieved from Internet:<A Feedback Mechanism for Prediction-based Anomaly Detection in Content Delivery Networks> (Year: 2020).*

Fragoso, L., StAble: Making Player Modeling Possible for Sandbox Games, Retrieved from Internet:<https://harvest.usask.ca/handle/10388/12671> (Year: 2020).*

Zeragrelli, M., Calculus II for Dummies, Retrieved from Internet:<https://cds.cern.ch/record/1748126> (Year: 2016).*

Harichane,I., et al, A Proposal of Kubernetes Scheduler Using Machine-Learning on CPU/GPU Cluster, Retrieved from Internet:<https://link.springer.com/chapter/10.1007/978-3-030-51965-0_50> (Year: 2020).*

Alipour, H., et al, Online Machine Learning for Cloud Resource Provisioning of Microservice Backend Systems, Retrieved from Internet:<https://ieeexplore.ieee.org/abstract/document/8258201>(Year: 2017).*

Joseph, C., et al, InMA: Dynamic Interaction-aware resource allocation for containerized microservices in cloud environments, Retrieved from Internet:<https://www.sciencedirect.com/science/article/pii/S1383762120300758> (Year: 2020).*

Zhou, Y., et al, Graph-Based Method for App Usage Prediction with Attributed Heterogeneous Network Embedding, Retrieved from Internet:<https://www.mdpi.com/1999-5903/12/3/58>(Year: 2020).*

Patanjali, S., et al, Cyclops: A Micro Service based approach for dynamic Rating, Charging & Billing for cloud, Retrieved from Internet:<https://ieeexplore.ieee.org/abstract/document/7231226>(Year: 2015).*

Mell et al., "The NIST Definition of Cloud Computing", Recommendations of the National Institute of Standards and Technology, Sep. 2011, 7 pages.

* cited by examiner

| | Step 1 | Step 2 | Step 3 | Step 4 |
|---|---|---|---|---|
| 1 | A($X_0$, $Y_0$) | B($X_1$, $Y_1$) | C($X_2$, $Y_2$) | D($X_3$, $Y_3$) |
| 2 | B($X_1$, $Y_1$) | C($X_2$, $Y_2$) | D($X_3$, $Y_3$) | M($X_{M-1}$, $Y_{M-1}$) |
| ... | ... | | | ... |

PREDICTIVE MICROSERVICES ACTIVATION USING MACHINE LEARNING

BACKGROUND

The present disclosure relates to microservices, and, more specifically, to predictive microservices activation using machine learning.

Microservices are a cloud native architectural approach whereby an application is composed of multiple loosely coupled and separately deployable smaller components, where the smaller components can be referred to as services or microservices. Microservices can each be associated with a stack, communicate with each other via event streaming, message brokers, and/or Representational State Transfer (REST) Application Programming Interfaces (APIs), and/or be organized by business capability.

Microservices provide numerous benefits and advantages. For one, using microservices makes source code easier to update. For another, developers can use different stacks having characteristics suited to different microservices. Finally, microservices can be scaled independently of each other, thereby improving computational efficiency by enabling a frequently used microservice of an application to be scaled rather than requiring the application be scaled in its entirety.

SUMMARY

Aspects of the present disclosure are directed toward a computer-implemented method comprising training a machine learning model using a plurality of sequences of coordinates, where the plurality of sequences of coordinates are respectively based upon a corresponding plurality of series of vectors generated from historical usage data for an application and its associated microservices. The method further comprises inputting a new sequence of coordinates representing a series of application operations to the machine learning model. The method further comprises identifying a predicted microservice for future utilization based on an output vector generated by the machine learning model. The method further comprises activating the predicted microservice prior to the predicted microservice being called by the application.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cloud microservices, and, more specifically, to predictive microservices activation using machine learning. While not limited to such applications, embodiments of the present disclosure may be better understood in light of the aforementioned context.

Aspects of the present disclosure are directed toward predictively activating microservices before they are called by an application. Predictively activating microservices improves application performance by reducing latency associated with microservice initiation. Further aspects of the present disclosure deactivate or idle active microservices that are not predicted to be needed. Deactivating or idling active microservices that are not needed can improve performance by freeing resources for the application. In predicting which microservices to activate and deactivate, aspects of the present disclosure can utilize machine learning models such as, for example, recurrent neural networks (RNNs). Regardless of the type of machine learning model used, training data can be based on line graphs corresponding to sequences of application operations, vectors of the line graphs, and/or sequences of coordinates based on the vectors). In order to increase accuracy of the model over time, aspects of the present disclosure can provide feedback to the machine learning model to use as additional training data based on accurate and/or inaccurate predictions made by the machine learning model. Finally, in situations where the machine learning model may make an incorrect prediction and fail to proactively activate a needed microservice, aspects of the present disclosure can include a dynamic buffer pool configured to hold reserved resources capable of expeditiously activating any needed microservice that was not predicted.

Collectively, aspects of the present disclosure realize (i) reduced latency (by proactively activating microservices before they are called); and/or (ii) improved resource efficiency (by proactively deactivating microservices that are not anticipated to be used) relative to technologies not employing predictive microservice activation methodologies. Furthermore, even relative to any known predictive microservice activation methodologies, aspects of the present disclosure exhibit improved performance through (i) improved accuracy (e.g., due to feedback-based re-training of the machine learning model); (ii) improved model efficiency (e.g., by formatting training data using line graphs, vectors of line graphs, and/or sequences of coordinates based on the vectors); and/or (iii) improved redundancy (e.g., a dynamic buffer pool for promptly activating unpredicted microservices).

Figure 1:
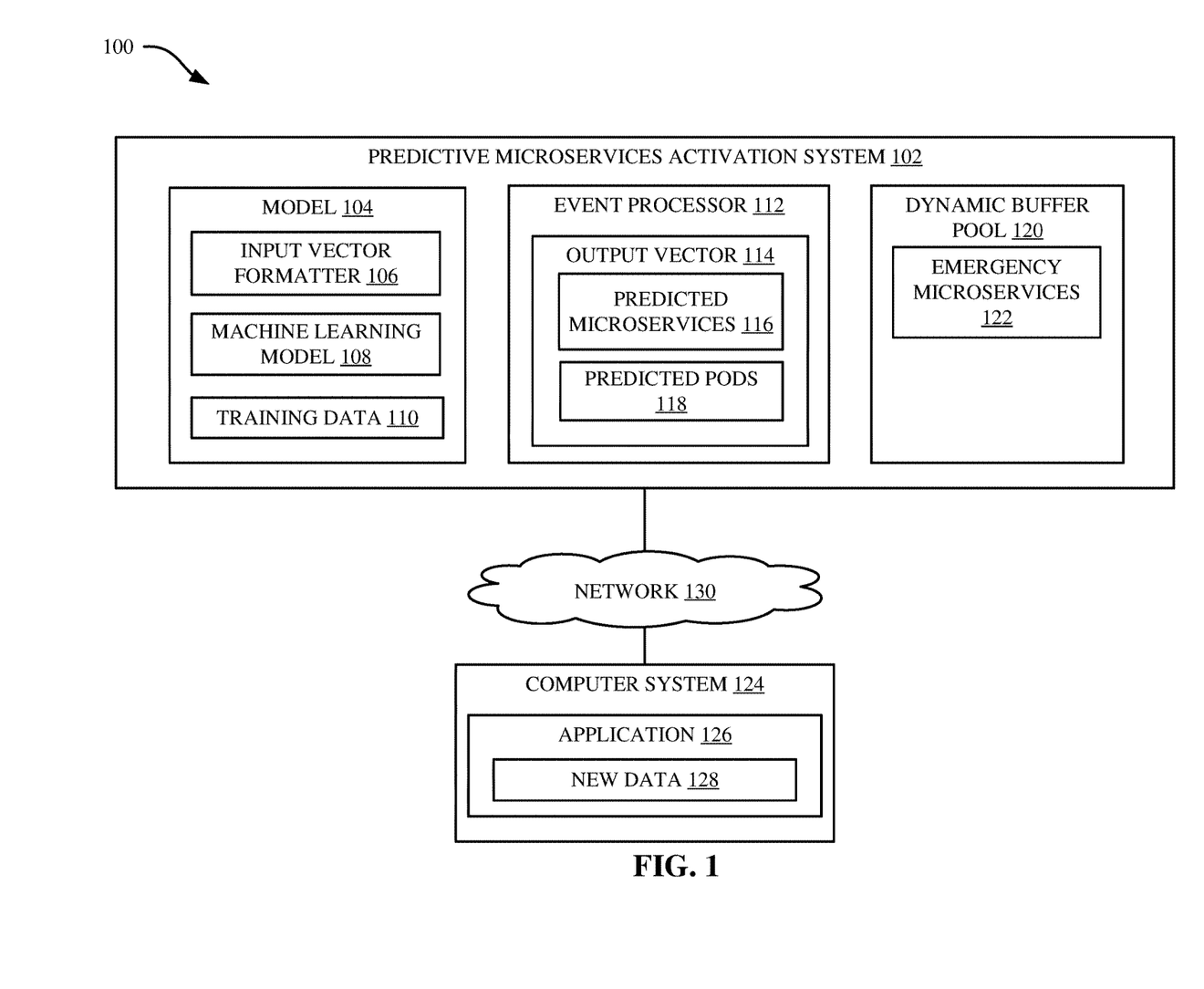
FIG. 1 illustrates a block diagram of an example computational environment for predictive microservices activation, in accordance with some embodiments of the present disclosure.

Referring now to the figures, FIG. 1 illustrates a block diagram of a computational environment 100 for predictive microservices activation. The computational environment 100 includes a predictive microservices activation system 102 having stored therein (or communicatively coupled thereto) a model 104, an event processor 112, and a dynamic buffer pool 120.

The model 104 can include input vector formatter 106 for converting training data 110 and/or new data 128 into a format ingestible by a machine learning model 108. The machine learning model 108 can be based on one or more machine-learning algorithms. Machine-learning algorithms can include, but are not limited to, decision tree learning, association rule learning, artificial neural networks (ANN), RNNs, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The machine learning model 108 can be trained on the training data 110 for predicting future microservice usage given a series of operations (e.g., new data 128 from real-time operation of an application 126). Advantageously, predicting future microservice usage can enable the predictive microservice activation system 102, the application 126, and/or another aspect of the present disclosure to activate, initiate, or awaken one or more predicted microservices 116 before they are called by the application 126. Proactively activating predicted microservices 116 can cause the application 126 to function more effectively by reducing time associated with activating a microservice. Accordingly, an application 126 utilizing aspects of the present disclosure can experience reduced latency and improved performance.

The training data 110 can comprise historical usage data for the application 126. In some embodiments, the input vector formatter 106 formats the training data 110 by generating line graphs of historical sequences of operations implemented by the application 126. In some embodiments, the line graphs are converted to a series of vectors, where each vector is a directed line from a first operation to a subsequent operation. In some embodiments, the series of vectors are converted to a sequence of coordinates, where each of the coordinates corresponds to a difference of a coordinate corresponding to the first operation subtracted from a coordinate corresponding to the subsequent operation. Training data 110 formatted according to the input vector formatter 106 is discussed in more detail hereinafter with respect to FIGS. 2, 3A, 3B, and 5.

Machine learning model 108 can be trained on the training data 110. After training, the machine learning model 108 can ingest new data 128 (e.g., generated from real-time usage) of the application 126. The machine learning model 108 can generate an output vector 114 based on the new data 128. The output vector 114 can be provided to the event processor 112 for the purposes of converting the output vector into intelligible information, such as information indicative of predicted microservices 116 and/or predicted pods 118. As is understood by one skilled in the art, pods can be utilized in Kubernetes® implementations for treating multiple containers as a single unit of deployment. Accordingly, in some embodiments, a single pod can be associated with multiple microservices, or vice versa, a single microservice can be associated with multiple pods. As a result, in embodiments utilizing predicted pods 118, the predicted pods 118 can be used as a mechanism for activating the predicted microservices 116.

The event processor 112 can provide an indication of the predicted microservices 116 and/or the predicted pods 118 to the application 126 so that the application 126 can proactively activate the predicted microservices 116.

If the predicted microservices 116 are determined to be accurate (e.g., the predicted microservices 116 are called by the application 126 within a threshold time period of proactively activating the predicted microservices 116), then this feedback can be provided back to the model 104 as supplemental, additional, or new training data 110 (e.g., where the new data 128 can comprise the input vector, and the predicted microservices 116 can comprise the outcome or a subsequent operation). In contrast, if the predicted microservices 116 are determined to be inaccurate (e.g., the predicted microservices 116 are not called by the application 126 within the threshold time period of proactively activating the predicted microservices 116), then this feedback can be provided back to the model 104 as supplemental, additional, or new training data 110 (e.g., where the new data 128 can comprise the input vector, and the actually called microservices—rather than the predicted microservices 116—can comprise the outcome or a subsequent operation). In some embodiments, inaccurate predictions can trigger re-training of the machine learning model 108 using the feedback. In other embodiments, the machine learning model 108 can be re-trained using any collected feedback at static or dynamic intervals.

In situations where the predicted microservices 116 are not accurate, the predictive microservices activation system 102 can utilize the dynamic buffer pool 120 to expediently activate one or more emergency microservices 122, where the emergency microservices 122 can be the microservices actually called by the application 126. The dynamic buffer pool 120 can hold memory, processing, bandwidth, and/or other resources in reserve as a backup for efficiently activating emergency microservices 122 in situations where the predicted microservices 116 are incorrect. Over time, as the model machine learning model 108 is re-trained using feedback from correct and incorrect predicted microservices 116, the machine learning model 108 becomes increasingly accurate, and the amount of resources reserved by the dynamic buffer pool 120 can be decreased.

Although predictive microservices activation system 102 is shown communicatively coupled to a computer system 124 executing the application 126 by a network 130, in other embodiments, the predictive microservices activation system 102 is incorporated into (e.g., downloaded to, installed on, and executed on) the same computer system 124 implementing the application 126. In yet other embodiments, the predictive microservices activation system 102 can be a service provided to numerous applications running on numerous physical or virtual computer systems. In yet other embodiments, the predictive microservices activation system 102 can split its functionality between a remote server (not shown) and the physical or virtual computer system 124 implementing the application 126. In such embodiments, the remote server can be configured to retrieve training data 110 from the application 126, train the machine learning model 108, and provide the trained machine learning model 108 to the application 126 for storage and execution on resources of the computer system 124. Periodically, the remote server can retrain the machine learning model 108 using new data 128 collected from the application 126, and the remote server and provide updated versions of the machine learning model 108 to the application 126 to replace the previous version stored on and executed by the computer system 124.

The predictive microservices activation system 102 and the computer system 124 can be any system having a computer-readable storage medium and a processor capable of executing instructions stored on the computer-readable storage medium. For example, the predictive microservices activation system 102 and the computer system 124 can be a desktop, server, tablet, smartphone, virtual machine, or another type of computer system. The application 126 can be any computer-implemented application now known or later developed such as, but not limited to, an embedded system, a desktop application, a web application, a web service application, a console application, a cloud application (e.g., infrastructure-as-a-service, platform-as-a-service, software-as-a-service, compute services, storage services, data management services, networking services, etc.), and/or other applications.

Network 130 can be any network now known or later developed. For example, network 130 can be an intranet, the Internet, a wide area network (WAN), a local area network (LAN), a personal area network (PAN), or a another type of network that physically or wirelessly connects (directly or indirectly) multiple data processing systems together on a permanent or intermittent basis.

Figure 2:
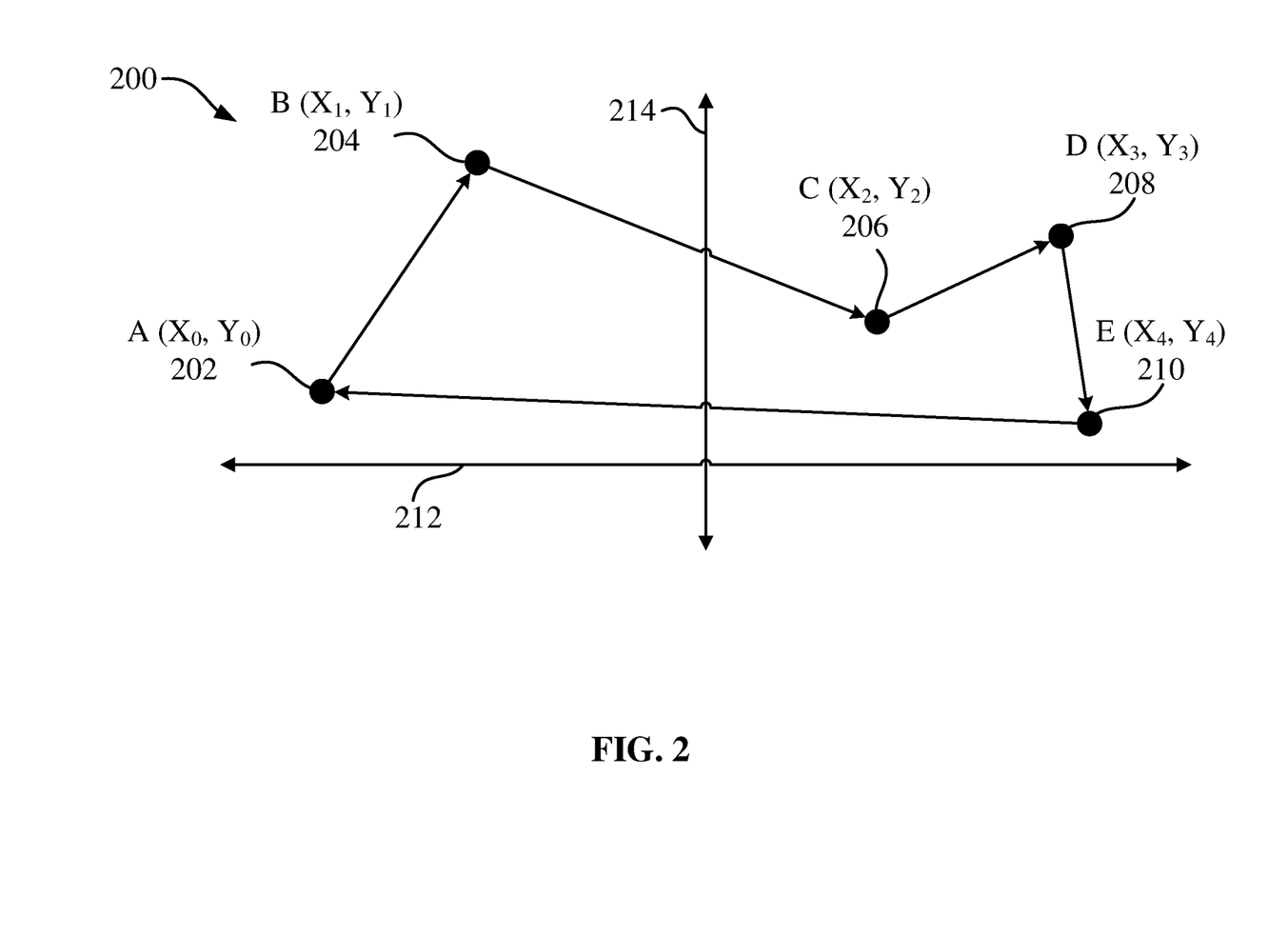
FIG. 2 illustrates a diagram of an example sequence of operations represented as vectors, in accordance with some embodiments of the present disclosure.

FIG. 2 illustrates a diagram of an example sequence of operations 200 represented as a series of vectors, in accordance with some embodiments of the present disclosure. The sequence of operations 200 is composed of five points, each representing an operation of an application. Vectors directed from one point to another represent sequences of operations. Accordingly, point A ($X_0$, $Y_0$) 202 is a first operation, point B ($X_1$, $Y_1$) 204 is a second operation subsequent to the first operation, point C ($X_2$, $Y_2$) 206 is a third operation subsequent to the second operation, point D ($X_3$, $Y_3$) 208 is a fourth operation subsequent to the third operation, and point E ($X_4$, $Y_4$) 210 is a fifth operation subsequent to the fourth operation.

As can be seen, the points are represented by two-dimensional coordinates arranged between two perpendicular axes—an x-axis 212 and a y-axis 214. In some embodiments, the coordinates of each point representing an operation are normalized so that the coordinates fall between −1, 1, inclusive, on the x-axis 212 and −1, 1, inclusive, on the y-axis 214.

Normalization can be performed based on maximum and minimum values. In some embodiments, the maximum and minimum values dynamically change as a function of time insofar as the type of operations are executable in an application can change over time as the functionality of the application progresses.

For example, normalized x-values can be determined using Equation 1:

$$x_i = \frac{X_i - X_{min}}{X_{max} - X_i} \qquad \text{Equation 1}$$

In Equation 1, $x_i$ refers to the normalized x-value, $X_1$ refers to the actual x-value, $X_{min}$ refers to the minimum x-value, and $X_{max}$ refers to the maximum x-value. As previously discussed, $X_{min}$ and $X_{max}$ can be dynamically determined.

Similarly, normalized y-values can be determined using Equation 2:

$$y_i = \frac{Y_i - Y_{min}}{Y_{max} - Y_i} \qquad \text{Equation 2}$$

In Equation 2, $y_i$ refers to the normalized y-value, $Y_i$ refers to the actual y-value, $Y_{min}$ refers to the minimum y-value, and $Y_{max}$ refers to the maximum y-value. As previously discussed, $Y_{min}$ and $Y_{max}$ can be dynamically determined.

Figures 3A, 3B:
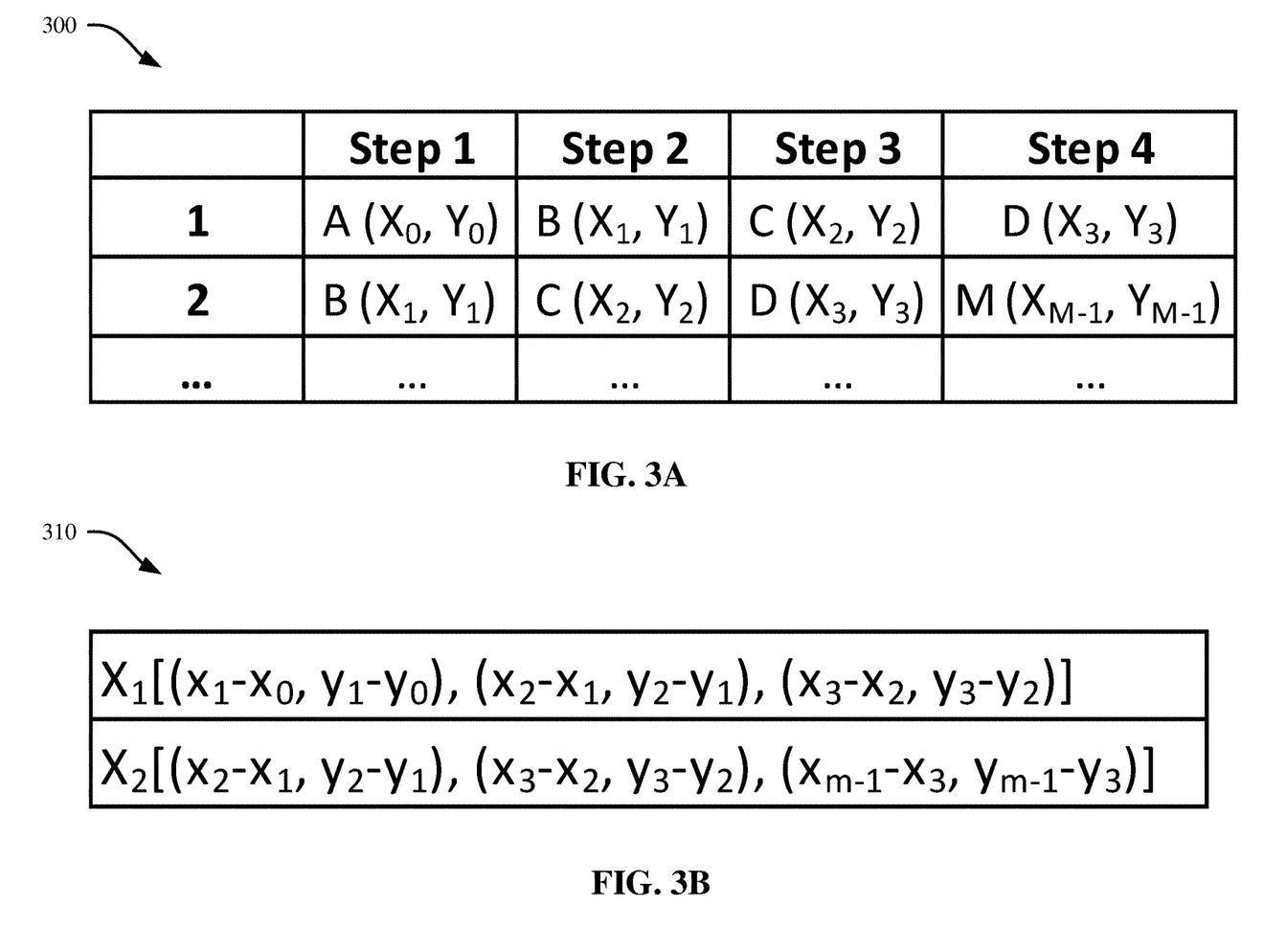
FIG. 3A illustrates an example table of coordinates representing operations, in accordance with some embodiments of the present disclosure.
FIG. 3B illustrates example sequences of coordinates based on respective series of vectors corresponding to application operations, in accordance with some embodiments of the present disclosure.

FIG. 3A illustrates an example table 300 of coordinates representing operations, in accordance with some embodiments of the present disclosure. The table 300 illustrates various iterations (e.g., 1, 2) of different sequences of operations (e.g., Step 1, Step 2, Step 3, Step 4). As shown, the table 300 includes in a first iteration of operations A ($X_0$, $Y_0$), B ($X_1$, $Y_1$), C ($X_2$, $Y_2$), and D ($X_3$, $Y_3$). The table 300 further includes a second iteration of operations of B ($X_1$, $Y_1$), C ($X_2$, $Y_2$), D ($X_3$, $Y_3$), and a theoretical next operation M ($X_{m-1}$, $Y_{m-1}$). In some embodiments, the iterations (e.g., 1, 2) can be input to a machine learning model as training data. As will be appreciated by one skilled in the art, although the example table 300 includes various iterations of four-step sequences, any number n-step sequences can be used beginning with n=2.

FIG. 3B illustrates an example table 310 of sequences of coordinates corresponding to the iterations illustrated in table 300 of FIG. 3A. In some embodiments, the sequences of coordinates are based on respective series of vectors corresponding to application operations. In the first sequence of coordinates, $X_1$, the first coordinate is ($X_1$-$X_0$, $Y_1$-$Y_0$). In other words, the first coordinate is the coordinates of an initial (e.g., first) operation subtracted from the coordinates of a subsequent (e.g., second) operation representing the vector of Step 1→ Step 2 (e.g., A ($X_0$, $Y_0$) to B ($X_1$, $Y_1$)). The second and third coordinates in the first sequence of coordinates, $X_1$, correspond to the differences in coordinates of Step 2→ Step 3 and Step 3→ Step 4. The second sequence of coordinates, $X_2$, follows the same pattern but according to the second iteration in the table 300 of FIG. 3A. For example, the vector of Step 1→ Step 2 corresponds to coordinates B ($X_1$, $Y_1$) to C ($X_2$, $Y_2$). Accordingly, the first coordinate of the second sequence of coordinates, $X_2$, corresponds to the coordinates of B subtracted from C, or ($X_2$-$X_1$, $Y_2$-$Y_1$). In some embodiments, the sequences of coordinates illustrated in the example table 310 of FIG. 3B can be used as training data for the machine learning model.

Figure 4:
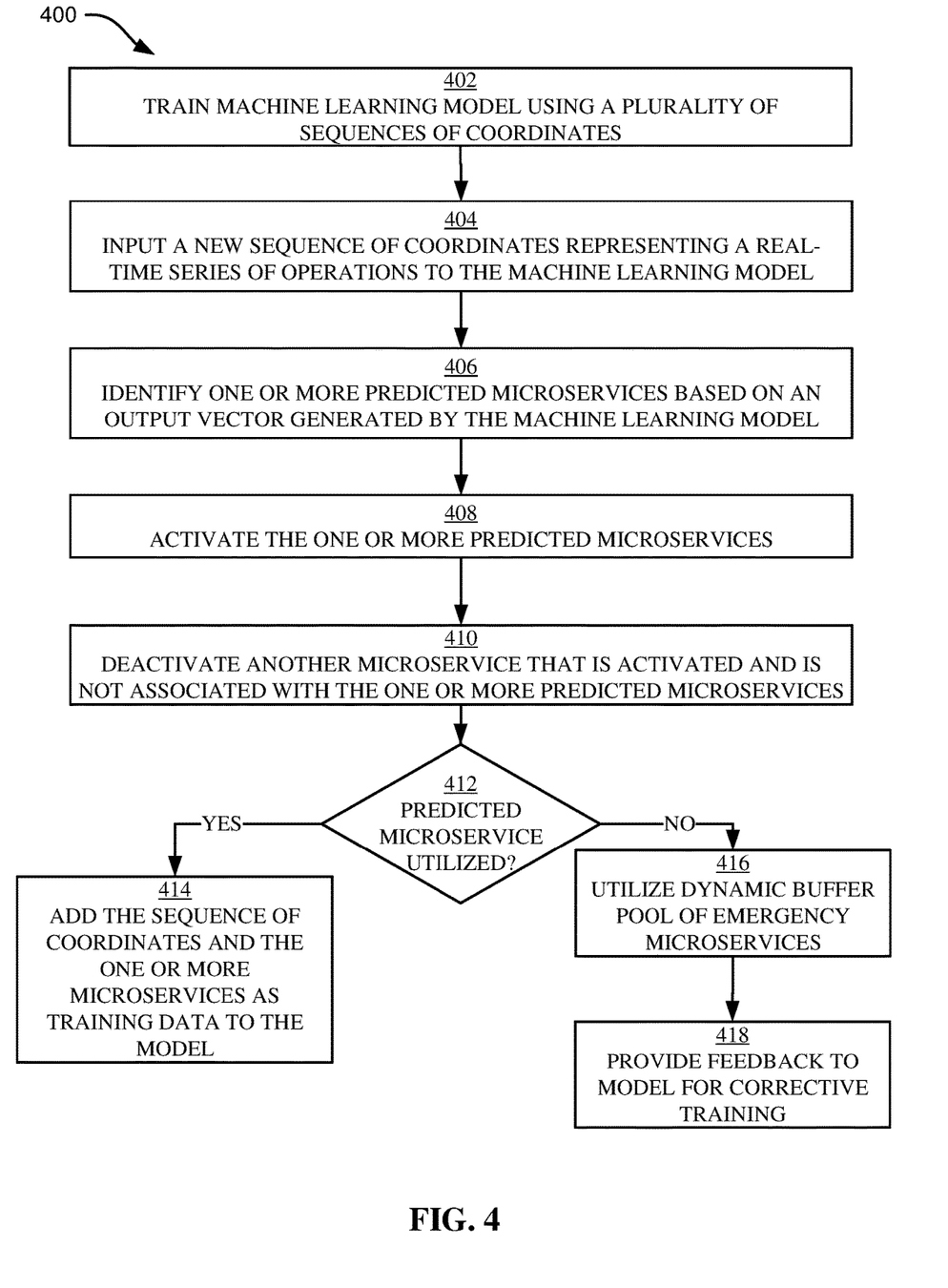
FIG. 4 illustrates a flowchart of an example method for predictive microservices activation, in accordance with some embodiments of the present disclosure.

FIG. 4 illustrates a flowchart of an example method 400 for predictive microservices activation, in accordance with some embodiments of the present disclosure. The method 400 can be implemented by a computer, a processor, a data processing system, a server, a predictive microservices activation system 102, or another configuration of hardware and/or software.

Operation 402 includes training a machine learning model using a plurality of sequences of coordinates (e.g., the sequences of coordinates illustrated in the example table 300 of FIG. 3A or table 310 of FIG. 3B). Operation 402 is discussed in more detail hereinafter with respect to FIG. 5.

Operation 404 includes inputting a new sequence of coordinates representing a real-time series of operations of an application to the machine learning model.

Operation 406 includes identifying one or more predicted microservices based on an output vector generated by the machine learning model. In some embodiments, the one or more predicted microservices are identified via one or more pods associated with the one or more predicted microservices.

Operation 408 includes activating the one or more predicted microservices. In embodiments including pods of microservices, operation 408 can include activating the predicted microservice via one or more pods associated with the predicted microservice. In some embodiments, operation 408 includes utilizing, by the application, the one or more predicted microservices within a threshold amount of time of activating the one or more predicted microservices.

Operation 410 includes deactivating (e.g., idling, hibernating, etc.) another microservice that is activated but is not associated with the one or more predicted microservices identified in operation 406. Advantageously, aspects of the present disclosure can predictively activate soon-to-be-used microservices and proactively deactivate microservices which are unnecessarily active (insofar as the machine learning model predicts that they will not be utilized within a threshold period of time). Deactivating unnecessarily active micro services can improve performance of an application by efficiently using resources associated with the application.

Operation 412 includes determining if the one or more predicted microservices were, in fact, called by the application within a threshold period of time of activating the one or more predicted microservices. If the one or more predicted microservices are called within the threshold period of time (412: YES), then the method 400 proceeds to operation 414 and adds the sequence of coordinates and the one or more predicted microservices as training data to the machine learning model. If the one or more predicted microservices are not called within the threshold period of time (412: NO), then the method 400 can proceed to operation 416 and utilize a dynamic buffer pool to activate, using the reserved resources of the dynamic buffer pool, the correct microservices. The method 400 can then proceed to operation 418 which includes providing feedback to the machine learning model for corrective training.

Figure 5:
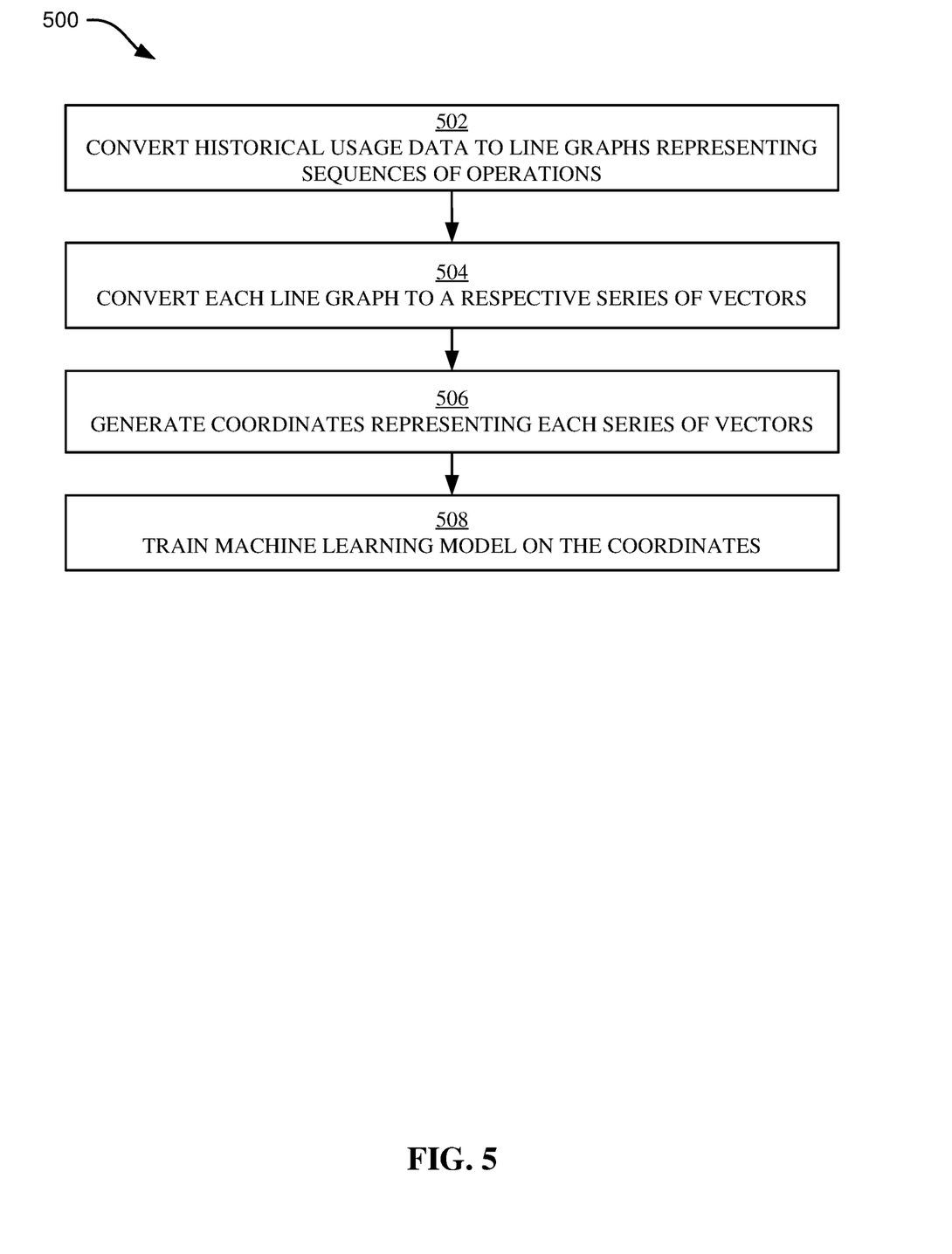
FIG. 5 illustrates a flowchart of an example method for training a model for predictive microservices activation, in accordance with some embodiments of the present disclosure.

FIG. 5 illustrates a flowchart of an example method 500 for training a model for predictive microservices activation, in accordance with some embodiments of the present disclosure. The method 500 can be implemented by a computer, a processor, a data processing system, a server, a predictive microservices activation system 102, or another configuration of hardware and/or software. In some embodiments, the method 500 is a sub-method of operation 402 of FIG. 4.

Operation 502 includes converting historical usage of an application to line graphs representing sequences of operations. In some embodiments, operation 502 includes converting operations to coordinates using any multi-dimensional coordinate scheme from two-dimensional Euclidean coordinates (e.g., (x,y)) to multi-dimensional coordinates using Euclidean, Spherical, Polar, or a different coordinate format. FIG. 2 illustrates an example line graph composed of numerous vectors.

Operation 504 includes converting each line graph to a respective series of vectors, where each vector can be associated with a consecutive pair of operations, and where each vector extends from an initial operation to a subsequent operation. Discrete vectors are illustrated as portions of the line graph of FIG. 2 and represented as transitions between steps in the table 300 of FIG. 3A.

Operation 506 includes generating sequences of coordinates representing each series of vectors. In some embodiments, the coordinates can be derived by subtracting coordinates of an initial (e.g., first) operation from coordinates of a subsequent (e.g., second operation). In some embodiments, operation 506 generates sequences of coordinates consistent with the example table 310 illustrated in operation 3B.

Operation 508 includes training the machine learning model on the generated sequences of coordinates. The machine learning model can be trained according to any number of methods and techniques, some of which are previously discussed with respect to FIG. 1.

Figure 6:
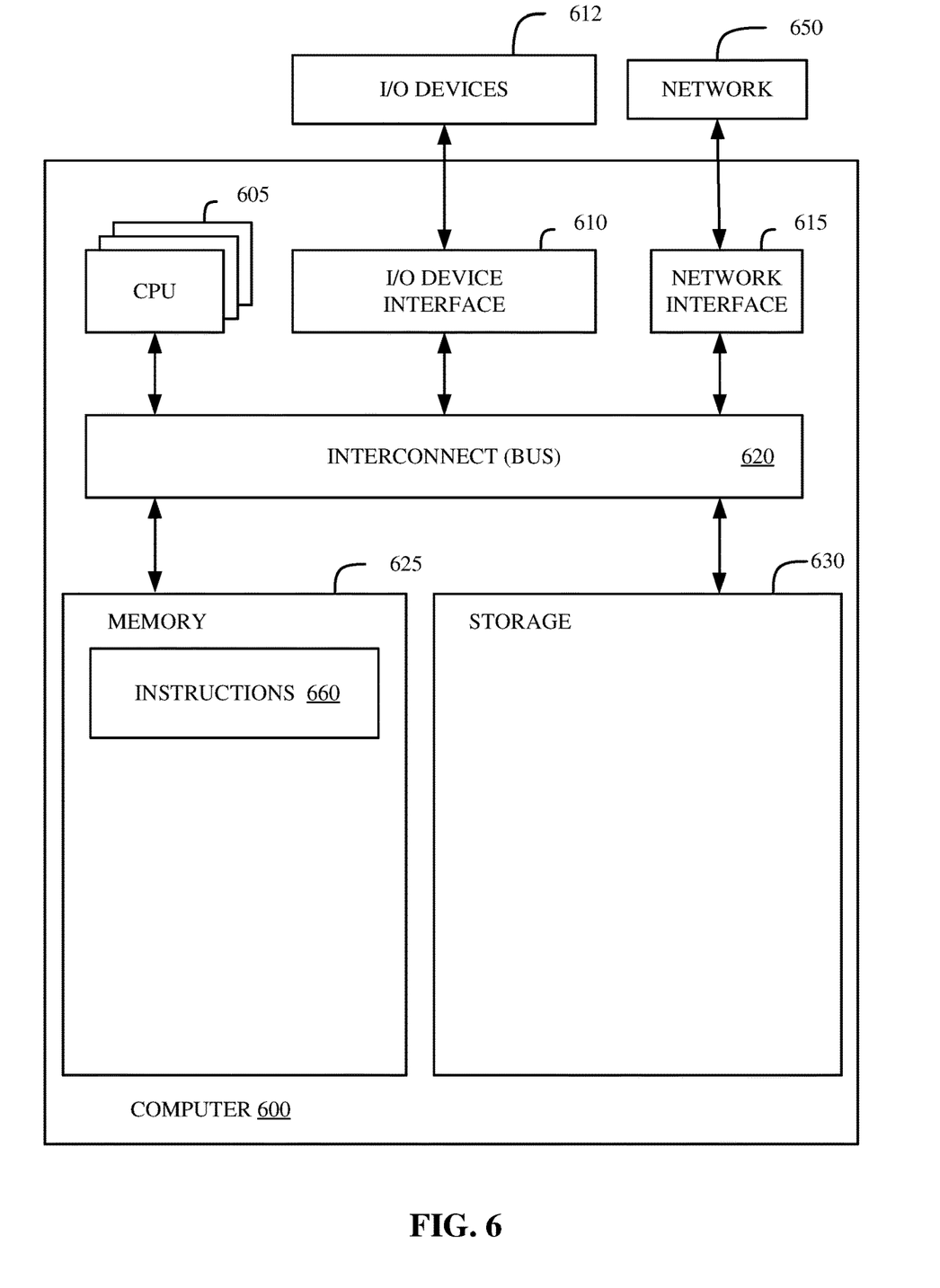
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all of the methods described in FIGS. 4-5 and/or implement the functionality discussed in one or more of FIGS. 1-3. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) one or more entities of the computational environment 100 (e.g., predictive microservices activation system 102, computer system 124) and/or other aspects of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 4-5 and/or implementing the functionality discussed in any portion of FIGS. 1-3. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
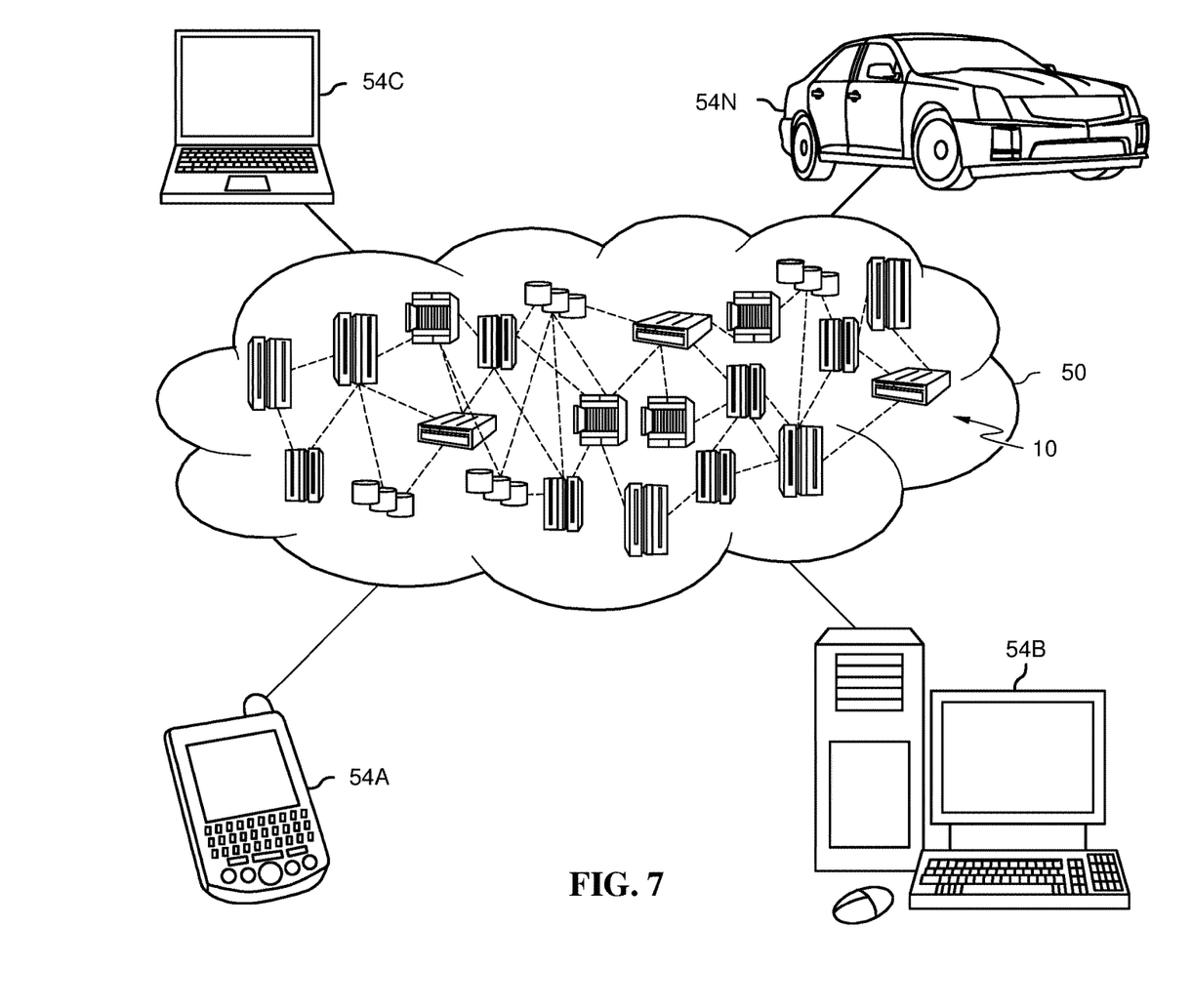
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
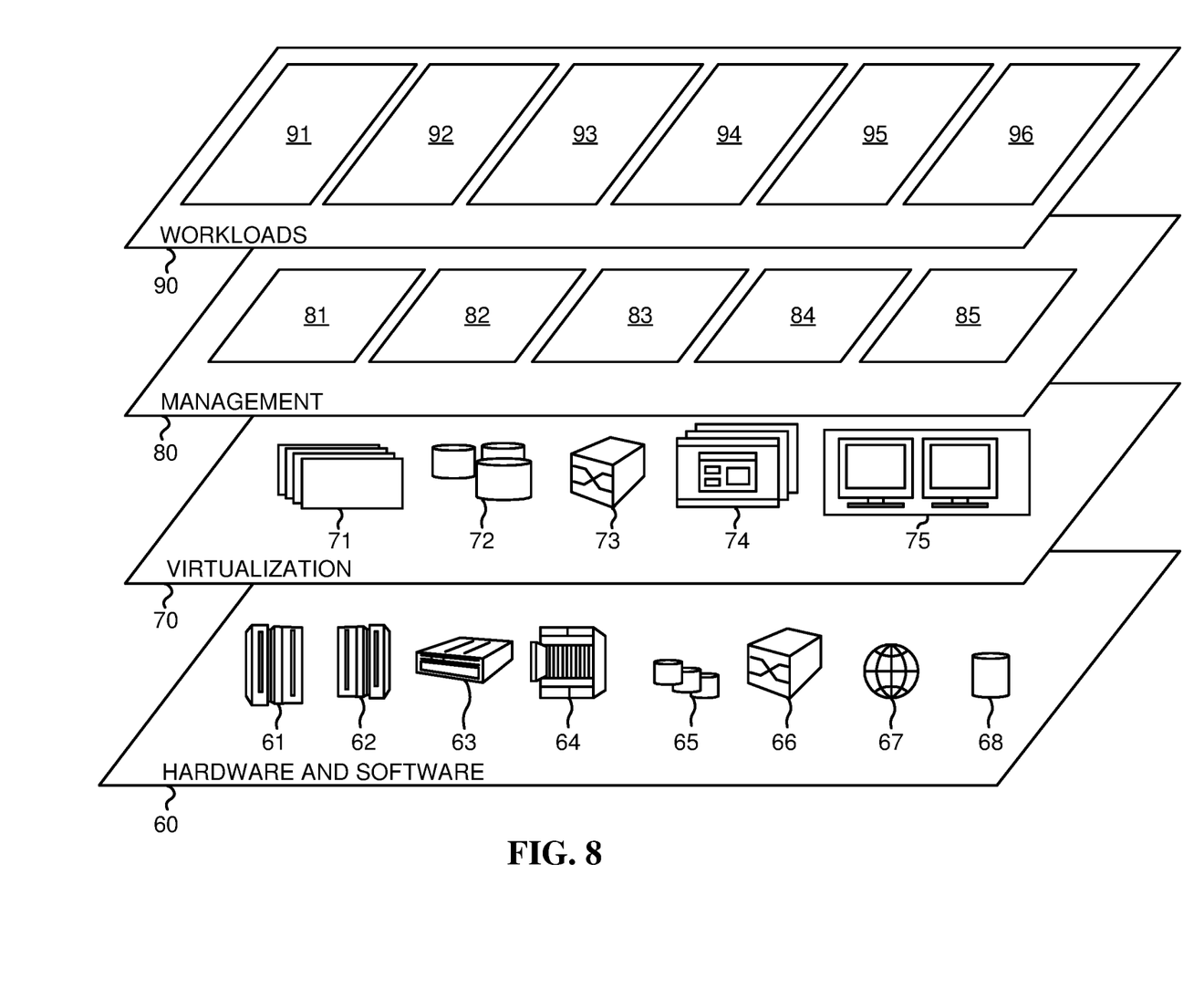
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive microservices activation 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 4-5 and/or implement any portion of the functionality discussed in FIGS. 1-3) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes training a machine learning model using a plurality of sequences of coordinates, wherein the plurality of sequences of coordinates are respectively based upon a corresponding plurality of series of vectors generated from historical usage data for an application and its associated microservices; inputting a new sequence of coordinates representing a series of application operations to the machine learning model; identifying a predicted microservice for future utilization based on an output vector generated by the machine learning model; and activating the predicted microservice prior to the predicted microservice being called by the application.

Example 2 includes the method of example 1, including or excluding optional features. In this example, the machine learning model is a recurrent neural network (RNN).

Example 3 includes the method of any one of examples 1 to 2, including or excluding optional features. In this example, the method includes deactivating a second microservice that is not a predicted microservice according to the output vector.

Example 4 includes the method of any one of examples 1 to 3, including or excluding optional features. In this example, training the machine learning model further comprises: converting the historical usage data to line graphs representing sequences of application operations; converting each line graph to a respective series of vectors; converting each series of vectors to a sequence of coordinates; and training the machine learning model based on respective sequences of coordinates. Optionally, the respective series of vectors includes, for each vector, a line directed from a first point corresponding to a first operation to a second point corresponding to a subsequent operation, and wherein a corresponding sequence of coordinates includes coordinates of the first operation subtracted from coordinates of the subsequent operation for each vector in the respective series of vectors. Optionally, the historical usage data is normalized such that each of the coordinates is between −1 and 1, inclusive, on an x-axis and −1 and 1, inclusive, on a y-axis.

Example 5 includes the method of any one of examples 1 to 4, including or excluding optional features. In this example, the method includes utilizing the microservice by the application; in response to utilizing the microservice by the application, providing the series of application operations and the predicted microservice as feedback to the machine learning model.

Example 6 includes the method of any one of examples 1 to 5, including or excluding optional features. In this example, the method includes determining that a different microservice that is not the predicted microservice is called by the application; activating the different microservice using a dynamic buffer pool of emergency microservices; and providing the series of application operations, the predicted microservice, and the different microservice as feedback to the machine learning model. Optionally, the method includes re-training the machine learning model using the feedback.

Example 7 includes the method of any one of examples 1 to 6, including or excluding optional features. In this example, the series of application operations are real-time operations.

Example 8 includes the method of any one of examples 1 to 7, including or excluding optional features. In this example, activating the predicted microservice further comprises activating a plurality of pods associated with the predicted microservice.

Example 9 includes the method of any one of examples 1 to 8, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 10 is a system. The system includes one or more processors; and one or more computer-readable storage media storing program instructions which, when executed by the one or more processors, are configured to cause the one or more processors to perform a method according to any one of examples 1 to 9.

Example 11 is a computer program product. The computer program product comprising one or more computer readable storage media, and program instructions collectively stored on the one or more computer readable storage media, the program instructions comprising instructions configured to cause one or more processors to perform a method according to any one of examples 1 to 9.

What is claimed is:

1. A computer-implemented method comprising:
    converting historical usage data for an application and its associated microservices to line graphs representing sequences of application operations, wherein the line graphs comprise points represented by two-dimensional coordinates arranged between an x-axis and a y-axis and normalized between −1 and 1, inclusive;
    converting respective line graphs to a series of vectors;
    converting respective series of vectors to a sequence of coordinates;
    training a machine learning model using respective sequences of coordinates;
    inputting a new sequence of coordinates representing a series of application operations to the machine learning model;
    identifying a predicted microservice for future utilization based on an output vector generated by the machine learning model; and
    activating the predicted microservice prior to the predicted microservice being called by the application.

2. The method of claim 1, wherein the machine learning model is a recurrent neural network (RNN).

3. The method of claim 1, further comprising:
    deactivating a second microservice that is not a predicted microservice according to the output vector.

4. The method of claim 1, wherein the respective series of vectors includes, for each vector, a line directed from a first point corresponding to a first operation to a second point corresponding to a subsequent operation, and wherein a corresponding sequence of coordinates includes coordinates of the first operation subtracted from coordinates of the subsequent operation for each vector in the respective series of vectors.

5. The method of claim 1, wherein the historical usage data is normalized such that each of the coordinates is between −1 and 1, inclusive, on an x-axis and −1 and 1, inclusive, on a y-axis.

6. The method of claim 1, further comprising:
    utilizing the microservice by the application;
    in response to utilizing the microservice by the application, providing the series of application operations and the predicted microservice as feedback to the machine learning model.

7. The method of claim 1, further comprising:
    determining that a different microservice that is not the predicted microservice is called by the application;
    activating the different microservice using a dynamic buffer pool of emergency microservices; and
    providing the series of application operations, the predicted microservice, and the different microservice as feedback to the machine learning model.

8. The method of claim 7, further comprising:
    re-training the machine learning model using the feedback.

9. The method of claim 1, wherein the series of application operations are real-time operations.

10. The method of claim 1, wherein activating the predicted microservice further comprises activating a plurality of pods associated with the predicted microservice.

11. The method of claim 1, wherein the method is performed by one or more computers according to software that is downloaded to the one or more computers from a remote data processing system.

12. The method of claim 11, wherein the method further comprises:
    metering a usage of the software; and
    generating an invoice based on metering the usage.

13. A system comprising:
    one or more processors; and
    one or more computer-readable storage media storing program instructions which, when executed by the one or more processors, are configured to cause the one or more processors to perform a method comprising:
    converting historical usage data for an application and its associated microservices to line graphs representing sequences of application operations, wherein the line graphs comprise points represented by two-dimensional coordinates arranged between an x-axis and a y-axis and normalized between −1 and 1, inclusive;
    converting respective line graphs to a series of vectors;
    converting respective series of vectors to a sequence of coordinates;
    training a machine learning model using respective sequences of coordinates;
    inputting a new sequence of coordinates representing a series of application operations to the machine learning model;
    identifying a predicted microservice for future utilization based on an output vector generated by the machine learning model; and
    activating the predicted microservice prior to the predicted microservice being called by the application.

14. The system of claim 13, wherein the machine learning model is a recurrent neural network (RNN).

15. The system of claim 13, wherein the one or more computer-readable storage media store additional program instructions which, when executed by the one or more processors, are configured to cause the one or more processors to perform the method further comprising:
    deactivating a second microservice that is not a predicted microservice according to the output vector.

16. The system of claim 13,
    wherein the historical usage data is normalized such that each of the coordinates is between −1 and 1, inclusive, on an x-axis and −1 and 1, inclusive, on a y-axis, and
    wherein the respective series of vectors includes, for each vector, a line directed from a first point corresponding to a first operation to a second point corresponding to a subsequent operation, and wherein a corresponding sequence of coordinates includes coordinates of the first operation subtracted from coordinates of the subsequent operation for each vector in the respective series of vectors.

17. The system of claim 13, wherein the one or more computer-readable storage media store additional program instructions which, when executed by the one or more processors, are configured to cause the one or more processors to perform the method further comprising:
- determining that a different microservice that is not the predicted microservice is called by the application;
- activating the different microservice using a dynamic buffer pool of emergency microservices;
- providing the series of application operations, the predicted microservice, and the different microservice as feedback to the machine learning model; and
- re-training the machine learning model using the feedback.

18. The system of claim 13, wherein activating the predicted microservice further comprises activating a plurality of pods associated with the predicted microservice.

19. A computer program product comprising one or more computer readable storage media, and program instructions collectively stored on the one or more computer readable storage media, the program instructions comprising instructions configured to cause one or more processors to perform a method comprising:
- converting historical usage data for an application and its associated microservices to line graphs representing sequences of application operations, wherein the line graphs comprise points represented by two-dimensional coordinates arranged between an x-axis and a y-axis and normalized between −1 and 1, inclusive;
- converting respective line graphs to a series of vectors;
- converting respective series of vectors to a sequence of coordinates;
- training a machine learning model using respective sequences of coordinates;
- inputting a new sequence of coordinates representing a series of application operations to the machine learning model;
- identifying a predicted microservice for future utilization based on an output vector generated by the machine learning model; and
- activating the predicted microservice prior to the predicted microservice being called by the application.

20. The computer program product of claim 19, wherein the respective series of vectors includes, for each vector, a line directed from a first point corresponding to a first operation to a second point corresponding to a subsequent operation, and wherein a corresponding sequence of coordinates includes coordinates of the first operation subtracted from coordinates of the subsequent operation for each vector in the respective series of vectors.

* * * * *